United States Patent

Raszkowski

Patent Number: 5,577,588
Date of Patent: Nov. 26, 1996

[54] LUBE ASSEMBLY FOR A TRANSMISSION FRICTION DEVICE

[75] Inventor: James A. Raszkowski, Indianapolis, Ind.

[73] Assignee: General Motors Corporation, Detroit, Mich.

[21] Appl. No.: 406,078

[22] Filed: Mar. 17, 1995

[51] Int. Cl.$^6$ ................................ F16D 13/74
[52] U.S. Cl. ................ 192/113.35; 192/70.12; 192/85 AA
[58] Field of Search ............ 192/113.35, 113.34, 192/70.12, 85 AA

[56] References Cited

U.S. PATENT DOCUMENTS

| | | | |
|---|---|---|---|
| 1,974,740 | 9/1934 | Gehres | 192/70.12 X |
| 2,968,372 | 1/1961 | Kern | 192/113.35 |
| 3,139,908 | 7/1964 | Strader | 192/113.35 |
| 3,391,767 | 7/1968 | Stow | 192/113.35 |
| 4,061,207 | 12/1977 | Ahlen | 192/113.35 |
| 4,270,647 | 6/1981 | Leber | 192/113 B |
| 4,899,861 | 2/1990 | Cummings, III | 192/70.12 X |
| 5,337,871 | 8/1994 | Testerman | 192/85 R |
| 5,469,943 | 11/1995 | Hill et al. | 192/113.35 |

Primary Examiner—Andrea L. Pitts
Attorney, Agent, or Firm—Donald F. Scherer

[57] ABSTRACT

A selectively engageable friction device, such as a clutch or brake, requires a supply of cooling fluid during engagement. The friction device is engaged by fluid directed to a piston through a passage in a shaft. A stepped diameter tube is slidably disposed in the shaft and is movable therein by fluid pressure to control the flow of lubrication and cooling fluid which is directed to the friction device during engagement and to prevent distribution of lubrication and cooling fluid when the device is disengaged.

3 Claims, 1 Drawing Sheet

5,577,588

LUBE ASSEMBLY FOR A TRANSMISSION FRICTION DEVICE

TECHNICAL FIELD

This invention relates the to cooling and lubrication of friction devices particularly during engagement.

BACKGROUND OF THE INVENTION

As a general rule, the friction devices in power transmissions are supplied with lube and cooling flow continuously from fluid which has passed through bushings or bearings. Controlled lube flow has been provided by using computer controlled lube flow circuits and valves or by establishing a valving relation between the actuating piston of the friction device in a shaft member.

The valving relation provides cooling flow when the device is engaged due to movement of the piston and requires closely held tolerances on the piston and shaft to control the proper timing of the delivery. This adds to the cost of manufacture. The wear normally associated with the friction device, which affects piston movement, can complicate this drawback. The use of computer controls adds to the manufacturing and operating cost and requires additional valving to control the flow. This valving is generally electrically activated and further adds to the cost of the system.

SUMMARY OF THE INVENTION

In power transmissions, friction devices are utilized to establish the gear ratio between the input member and the output member. These friction devices generally contain a plurality of interspersed discs of friction pads and steel discs which are splined to inner and outer hubs, respectively. One of the hubs is generally connected to a gear member and the other may be connected to a stationary housing or a rotating shaft member.

A fluid operated piston is slidably disposed in a housing adjacent to the friction devices and is generally fed fluid pressure for actuation from a central support member. The central support member with the present invention has a central passage in which is slidably disposed a stepped diameter tube. The tube provides an inner or central feed passage for the piston and an outer annular passage to distribute lubrication and cooling fluid. The tube has a large diameter at one end which is slidably disposed in the support member and a smaller diameter at the end nearest the piston, also slidably disposed in the support member.

The pressure utilized to activate the friction device is fed into the support member at the large diameter end and acts on that area to urge the tube to move longitudinally in the support member while the fluid is directed to the piston. The annular passage is connected with radial cooling and lubrication passages, one of which is directed to the friction device. The smaller diameter end of the tube closes the radial passage to the friction device to prevent lubrication and cooling flow thereto when the friction device is disengaged and engagement pressure is not present in the central passage.

The lubrication flow and the pressure thereof acts on the differential area between the large and small diameter ends to urge the tube in the passage closing direction. However, as previously mentioned, when the piston is pressurized to energize the friction device, the fluid pressure at the large diameter end acting on the differential area is greater than the lubrication pressure and therefore moves the tube to open the radial passage to permit lube and cooling flow to be introduced to the friction device. This permits controlled distribution of cooling fluid to the friction device at a time when the device is being engaged and prevents the use of lubrication fluid for the cooling function when the device is disengaged.

The linear or longitudinal movement of the tube is constant throughout the life of the transmission as there are no parts to wear and thereby change the position of the tube end relative to the passages, thus reducing the tolerances necessary at manufacture. The only significant tolerances that are required are tolerances of a large bore on one end and a small bore on the other end of the support member which will provide a sliding sealing contact with the outer diameters of the tube.

It is therefore an object of this invention to provide an improved cooling flow control for a fluid operated friction device.

In accordance with this object, it is an aspect of this invention to provide a tube member slidably disposed in a support member in a manner to control the flow of cooling fluid to a multi-plate friction device when the operating piston of the friction device is pressurized and to discontinue cooling flow then the piston is not energized.

Another aspect accompanying the present invention is in the use of clutch engagement pressure to initiate cooling flow and lube pressure to discontinue lube flow.

DESCRIPTION OF AN EXEMPLARY EMBODIMENT

Figure 1:
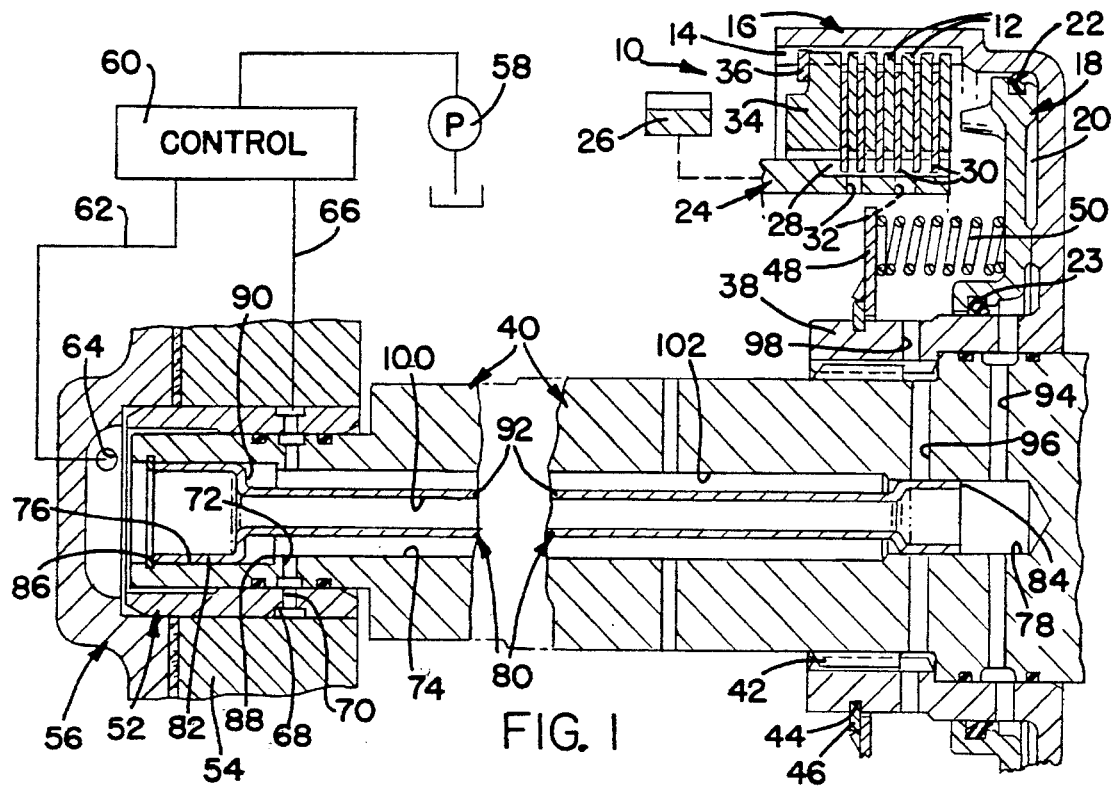
FIG. 1 is a cross-sectional elevational view of a portion of a power transmission having a friction device showing the cooling mechanism for the friction device disposed in one position.
Figure 2:
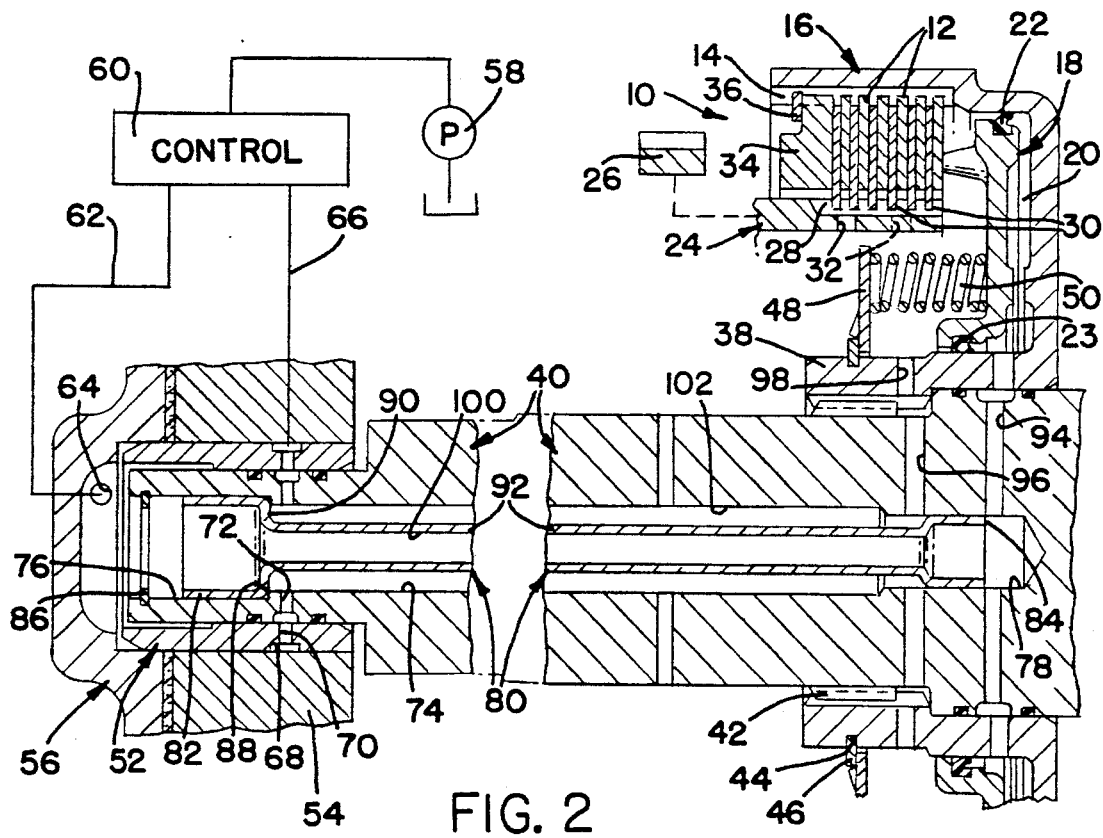
FIG. 2 is a view similar to FIG. 1 showing the flow control mechanism for the cooling fluid disposed in a second operating condition.

There is shown in FIGS. 1 and 2 a fluid operated clutch 10 having a plurality of friction discs 12 splined at 14 to a housing 16. The housing 16 supports a piston 18 and cooperates therewith to form a chamber 20. The piston 18 has a pair of annular seals 22 and 23 which cooperate with respective diameters on the housing 16 to maintain the chamber 20 substantially fluid tight.

The clutch 10 also has an inner hub member 24 drivingly connected with a gear member 26. The hub member 24 has a spline 28 to which is drivingly connected a plurality of friction discs 30 in a well known manner. The hub 24 has a plurality of radial passages 32 which will permit fluid flow through the hub 24 to a space between the friction discs 12 and 30. A backing plate or reaction plate 34 is splined at the spline connection 14 and prevented in leftward movement by a conventional locking ring 36.

The housing 16 has an inner hub 38 connected to a shaft 40 at a spline connection 42 which provides a drive connection between the shaft 40 and the housing 16. The hub 38 has a groove 44 in which a lock ring 46 is positioned. The lock ring 46 in turn positions a retainer plate 48 which is utilized to trap a plurality of compression springs, such as 50, between the plate 48 and the piston 18. The springs 50 operate as return springs for the clutch 10 in a well known manner.

The shaft 40 is rotatably supported in a bushing 52 which is positioned in a transmission housing 54. The bushing 52 also serves as a dowel member for an end cover 56 which closes the housing 54. Fluid pressure to energize the clutch by pressurizing chamber 20 is provided by a conventional positive displacement pump 58 through a conventional control mechanism 60. The control 60 may be any of the well known control mechanisms for power transmissions, such as hydraulic valve controls or electro-hydraulic valve controls.

The control 60 supplies fluid pressure through a passage 62 to a feed inlet passage 64 formed in the cover 56 and through a passage 66 to an annular recess 68 formed in the bushing 52. The fluid in passage 66 is continually supplied, whenever the transmission is operating, with low pressure cooling and lubrication fluid. The fluid in passage 62 is high pressure clutch engagement fluid which is directed to passage 64 only when it is desirable to engage the clutch 10 by pressurizing the chamber 20.

The annular recess 68 is in fluid communication with a plurality of radial passages 70 which, in turn, are in communication with annular passages 72. The passages 72 extend through the wall of the shaft 40 into a central passage or bore 74. The passage 74 has a large end bore 76 and a small end bore 78. The central passage 74 is fitted with a tube 80 which has a first tube end 82 slidably disposed in the end 76 and a second end 84 slidably disposed in the end bore 78. The end 82 and bore 76 are disposed in a sliding valve fit as is the end 84 and bore 78.

The tube 80 is limited in leftward movement by a retainer ring 86 and in rightward movement by a stop surface 88 formed in the bore 74, and a shoulder 90, formed on the tube 80 between the first end 82 and a central tube portion 92. The end bore 78 has communicating therewith a plurality of clutch feed radial passages 94 and a plurality of cooling feed passages 96. The passages 94 communicate through the hub 38 with the chamber 20 while the passages 96 communicate through radial passages 98 in the hub 38 to direct fluid to the inner surface of the hub 24 adjacent the passages 32. Fluid entering this area will be directed outward through the passages 32 to flow between the adjacent friction discs 12 and 30.

It should be appreciated that the diameter of tube end 82 is greater than the diameter of tube end 84. Therefore, when the clutch engaging pressure is directed via passage 64 into a central feed passage 100 formed through the tube 80, the force on the end 82 will be greater than the force on the end 84, resulting in the tube 80 being positioned as shown in FIG. 2. In this position, the clutch feed pressure in passage 64 is directed through the passages 94 to the chamber 20 to force the piston 18 to engage the friction discs 12 and 30.

Also, it can be seen in FIG. 2, at this time, that the passages 96 are open to an annular lube passage 102 formed between the outer surface of tube 80 and the inner surface of the central passage 74. The lube fluid will enter this annular passage 102 via the passage 72 and exit via the passage 96. As previously described, this fluid will be directed radially outwardly to the passages 32 from which it will be directed through the friction discs 12 and 30.

The pressure in the lube fluid is less than the clutch engagement pressure and, therefore, the force imposed on the differential area at the annular passage will not be great enough to move the tube against the clutch pressure. However, when the clutch is disengaged and the fluid pressure in passage 62 is exhausted, the differential area between the tube ends 82 and 84, as seen in the annular lube passage 102, will be subject to the lube pressure. This pressure will be great enough at this time to move the tube 80 leftward to the position shown in FIG. 1.

It can be seen in this position that the passages 96 are closed by the tube end 84, thereby discontinuing fluid flow to the friction discs 12 and 30 of the clutch 10. Therefore, when the clutch is disengaged, the cooling fluid is not supplied. This improves the overall efficiency of the transmission since there is now less fluid to be supplied via the lubrication and cooling circuit. These efficiency gains are particularly noted when the pump 58 is of the variable displacement type.

It should also be appreciated that the exact location of the radial passages 96 is not critical as the tube end 84 can be made of sufficient length so that the passages will be covered in the clutch "off" position and sufficient movement can be provided within the system to permit the opening of the passages 96 in the clutch engaged position. Thus, there is no critical edge valve relationship between the tube 84 and the passages 96. The shoulder 90 and stop surface 88 will limit the rightward movement, as previously described. These structures can be positioned with sufficient distance therebetween to ensure that the passages 96 will be opened even if the maximum tolerances are present when the shaft 40 is manufactured.

I claim:

1. A fluid operated torque transmitting assembly comprising:

a housing having a fluid chamber formed therein;

friction discs disposed in said housing;

a shaft member drivingly connected with said housing including a central fluid passage with a first diameter bore portion, a second diameter bore portion being smaller than said first diameter bore portion, and a plurality of radial fluid passages communicating with the central fluid passage and an outer surface of the shaft member;

a fluid control tube slidably disposed in said bore and cooperating therewith to provide a lubrication passage along an outer annular passage and a clutch feed passage, a first end slidably disposed in the first diameter bore portion, and a second end slidably disposed in the second diameter bore portion; and fluid supply means for providing fluid to said control tube for selectively engaging said torque transmitting assembly and for providing lubrication fluid to said friction discs, said fluid being operable on said control tube to urge said control tube in a direction to permit communication between two of said radial fluid passages to admit lubrication fluid to said friction discs when said torque transmitting assembly is engaged and to urge said control tube in another direction to discontinue fluid communication between said two radial fluid passages when said torque transmitting assembly is disengaged.

2. The assembly defined in claim 1, wherein said fluid control tube presents a first differential area to said clutch feed passage and a second differential area to said lubrication passage.

3. The assembly defined in claim 2, wherein said first and second differential areas cooperate with pressure fluid in the respective passages to impose forces on said tube in opposite directions.

* * * * *